(12) United States Patent
Hanaoka et al.

(10) Patent No.: US 6,920,122 B1
(45) Date of Patent: Jul. 19, 2005

(54) CONTROL METHOD OF CHANNEL ASSIGN

(75) Inventors: Seishi Hanaoka, Kodaira (JP); Yusuke Uchida, Tokyo (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/544,479

(22) Filed: Apr. 7, 2000

(30) Foreign Application Priority Data

Apr. 15, 1999 (JP) .......................................... 11-107539

(51) Int. Cl.$^7$ .............................................. H04Q 7/00
(52) U.S. Cl. ..................... 370/331; 370/437; 370/458; 370/463; 455/436; 455/450; 455/561; 455/102; 455/103; 375/222
(58) Field of Search ................................ 370/331, 334, 370/437, 458, 459, 463; 455/422, 424, 450, 453, 550, 557, 558, 561, 562, 102, 103; 375/222

(56) References Cited

U.S. PATENT DOCUMENTS

| | | | | |
|---|---|---|---|---|
| 5,511,067 A | * | 4/1996 | Miller | ........................ 370/335 |
| 6,108,536 A | * | 8/2000 | Yafuso et al. | ................ 455/424 |
| 6,144,652 A | * | 11/2000 | Avidor et al. | ................ 370/336 |
| 6,418,327 B1 | * | 7/2002 | Carey et al. | ............. 455/562.1 |
| 6,483,870 B1 | * | 11/2002 | Locklear et al. | ............ 375/222 |

* cited by examiner

*Primary Examiner*—Steven Nguyen
*Assistant Examiner*—Roberta Stevens
(74) *Attorney, Agent, or Firm*—Mattingly, Stanger, Malur & Brundidge, P.C.

(57) ABSTRACT

A control method of assigning a channel so as to cope flexibly with voice and high speed data communication services having different transmission rates in code-division multiple connection communications. A load required for a channel processing is compared with an allowable load, and a channel is assigned within the allowable load. When assignment of a busy channel is changed so as to be processed in another hardware, the synchronization of the processing is established first at the destination, then the channel is switched. It is thus possible to distribute hardware resources and software processings efficiently to users.

7 Claims, 19 Drawing Sheets

CONTROL METHOD OF CHANNEL ASSIGN

BACKGROUND OF THE INVENTION

The present invention relates to a control method for channel assignment with respect to a communication apparatus (base station) that processes data communicated through a plurality of channels. More particularly, the present invention relates to a communication apparatus suitably employable for a mobile communication system operated with use of a CDMA (Code Division Multiple Access) method.

In recent years, there has been a demand for mobile communications of various information transmission services, such as large capacity fast data communications of dynamic pictures, etc. in addition to conventional voice and data communications. In order to meet such a variety of service demands from many users, each base station is required to have a signal processing unit composed of a huge size circuit.

FIG. 1 shows a configuration of such a conventional base station used for a CDMA mobile communication system. In this case, voice communications are represented as low speed data rate communication services and data communications are represented as high speed data rate communication services. Although both voice communications and data communications are described below, communication services are not limited only to those communications; they are just picked up so as to denote that a base station is required to support a plurality of communication services supplied at different transmission rates.

A carrier frequency band signal received by an antenna 100 is converted to a base band received signal in an RF (Radio Frequency) unit 101, and then it is supplied to a base band unit 134. Each channel base band signal output from the base band unit 134 is superimposed with others in an output combination unit 107, and then is converted to a carrier frequency band signal and transmitted from the antenna 100.

In the base band unit 134, modem processing units 102-1 to 102-s are provided in accordance with the number of channels (s) used in the base station. Each modem processing unit 102 is used to transmit/receive signals of one channel. A matched filter (NW) 135 and a peak detector 136 are provided for a group of channels, respectively, so that path searching is done in each channel intermittently. The peak detector 136 selects a larger correlation value (denoting a multi-path receiving timing) of correlation values output from the MF. The selected path timing is set for a correlator 108-1 to n(n: number of fingers) of a modem processing unit 102-1 to 102-s of the corresponding channel so as to carry out a despreading processing for each finger.

In each base station, path searching is done for each channel periodically in a time sharing manner as described above. Consequently, an MF can be shared by a plurality of channels, thereby the system circuit is reduced in size. Even in this case, however, because each channel is provided with a modem processing unit 102, as many modem processing units 102 must be provided as the number of users in the system.

Furthermore, for a high speed user transmission rate, each block operation must be speeded up, and, accordingly, the circuitry is expanded in size, although the block configuration of the modem processing unit 102 remains the same.

If a base station supports both voice and high speed data communication services, the modem processing unit 102 provided for each channel is roughly classified into the following two configuration types.

One of the two types is a configuration in which as many of the modem processing units for voice 201-1 to 201-i and the modem processing units for high speed data communications 202-1 to 201-j in the base band unit 134 shown in FIG. 2 are provided as the number of system-supported users. The number of users for high speed data communications is more than the number of users for voice communications. However, because the transmission rate is high, the processing block circuit size for high speed data communications comes to be larger than that for voice communications.

The other type configuration is as shown in FIG. 3, wherein as many of the high performance modem processing units for voice/data communications 301 are provided as the number of system-supported users (301-1 to k), so that both voice and data communications are processed in a common processing block. The inner configuration of the base band unit 134 is only a difference between FIG. 2 and FIG. 3. The configurations of the RF unit 101, the output combination unit 107, and other components in FIG. 3 are the same as those in FIG. 2.

SUMMARY OF THE INVENTION

In the configuration shown in FIG. 2, both modem processing units 201 and 202 are required for voice and data communications, thereby the hardware is expanded in size. If the hardware composed as shown in FIG. 2 is used as a base station each signal entered to a modem processing unit is identified as a voice communication signal or a high speed data communication signal, and then an idle channel is assigned for the signal. In this configuration shown in FIG. 2, a voice communication channel is assigned independently of a data communication channel, therefore, the same channel cannot be used for both communication types.

On the other hand, in the hardware configuration shown in FIG. 3, the modem processing unit 301 can process signals of both voice and data communications. If the hardware composed as shown in FIG. 3 is used, therefore, identification between voice and data communication signals can be omitted and channel assignment is carried out for each signal if there is a idle channel. Because this controlling method does not depend on the type of signals entered to the modem processing unit in this case, the channel assignment is performed more simply than that of the hardware configuration shown in FIG. 2. Although all the users in the system do not request the maximum transmission rate service (for example, high speed data communication), each processing block hardware in the modem processing unit is composed so as to cope with the maximum number of users who may possibly request the maximum transmission rate service. The usage efficiency of the hardware resources is therefore not so high. In addition, the hardware must be further expanded in size so as to cope with the maximum transmission rate service than that of the hardware employed only to process voice data. Consequently, the hardware size of the base station especially for processing signals from many users is expanded excessively compared with the processing load of a normal system. This has been a problem of the conventional technique.

The conventional technique has also been confronted with another similar problem, which arises when a base station is composed as a fault-tolerant one so as to continue the system operation even when the system is partially down. In order to compose a base station as a fault-tolerant one, a method is employed so that a spare apparatus and another spare running system provided with switching means are disposed in addition to the normal running system. Unlike the hardware configuration shown in FIG. 2, the hardware configuration shown in FIG. 4 is thus provided with a spare running base band unit. In FIG. 4, two types of spare hardware units must be provided: the voice processing block 410 and the data processing block 411. This is because a voice channel and a data channel are independent of each other and the same channel cannot be used commonly for both communication types.

The conventional technique has been confronted with still another problem in that the hardware for a base station that supports a hand-over processing over sectors is expanded in size.

A base station divides its control range (cell: 501 ) into a plurality of sectors (502-1 to 501-3) with use of directional antennas (504) as shown in FIG. 5. If a mobile station 505 moves and the control range is changed from one sector to another, a hand-over processing is required to maintain the communication. In the case of the CDMA method, such a hand-over processing is carried out without instantaneous disconnection, so that the mobile station comes to communicate with two or three base stations simultaneously for a while.

When taking the hand-over processing into consideration, a base station is composed of a receiving card 601 provided for each sector and a sector combination card 602 provided for a sector combination as shown in FIG. 6. Those cards 601 and 602 are connected to each other through a bus 603. In a hand-over processing, the base station transmits a signal received from one sector through a receiving card 601-m and a signal received from another sector through a receiving card 601-n to a sector combination card 602-p through the data collection bus 603, thereby signals from those sectors are combined in the sector combination card 602-p.

In order to combine signals received by different receiving cards over sectors, a bus configuration as shown in FIG. 6 can be selected. The bus configuration enables every combination of a receiving card and a sector combination card to be connected to each other. However, this configuration cannot avoid the problem that the receiving function must be separated from the inter-sector combining function, so that it is difficult to integrate both functions in the same card or in the same chip.

In particular, when a base band is composed of many sectors, it will be difficult to distribute the signals from all the sectors to all the receiving cards. Because there is a small possibility that a plurality of received signals are processed in a hand-over processing over sensors in the same receiving card, the hand-over processing over sectors in the same card often fails, thereby integration of the receiving card and sector combination card becomes more difficult.

Under the circumstances, it is an object of the present invention to provide a method for multiplexing processings of a plurality of channels and high speed transmission rate channel processings by reading data from a storage means at a higher rate than that of data input to the storage means with use of a signal processing unit provided with a storage for storing signals entered from a plurality of channels and a calculation means necessary for modulation and demodulation.

When employing the above-described method, a hardware unit is used to multiplex processings of a plurality of channels, thereby the hardware can be reduced significantly in size. In addition, there is no need to prepare a hardware unit for each channel, thereby channel assignment can be controlled so as to disperse processings so that the load of the base station is not concentrated on a specific hardware or software processing.

Furthermore, in a hand-over processing over sectors, channel assignment can be controlled so as to enable a hardware unit to process signals exchanged with a plurality of sectors, thereby it makes it easier to carry out the hand-over processing over sectors.

DETAILED DESCRIPTION OF THE PREFERRED EMBODIMENTS

Figure 7:
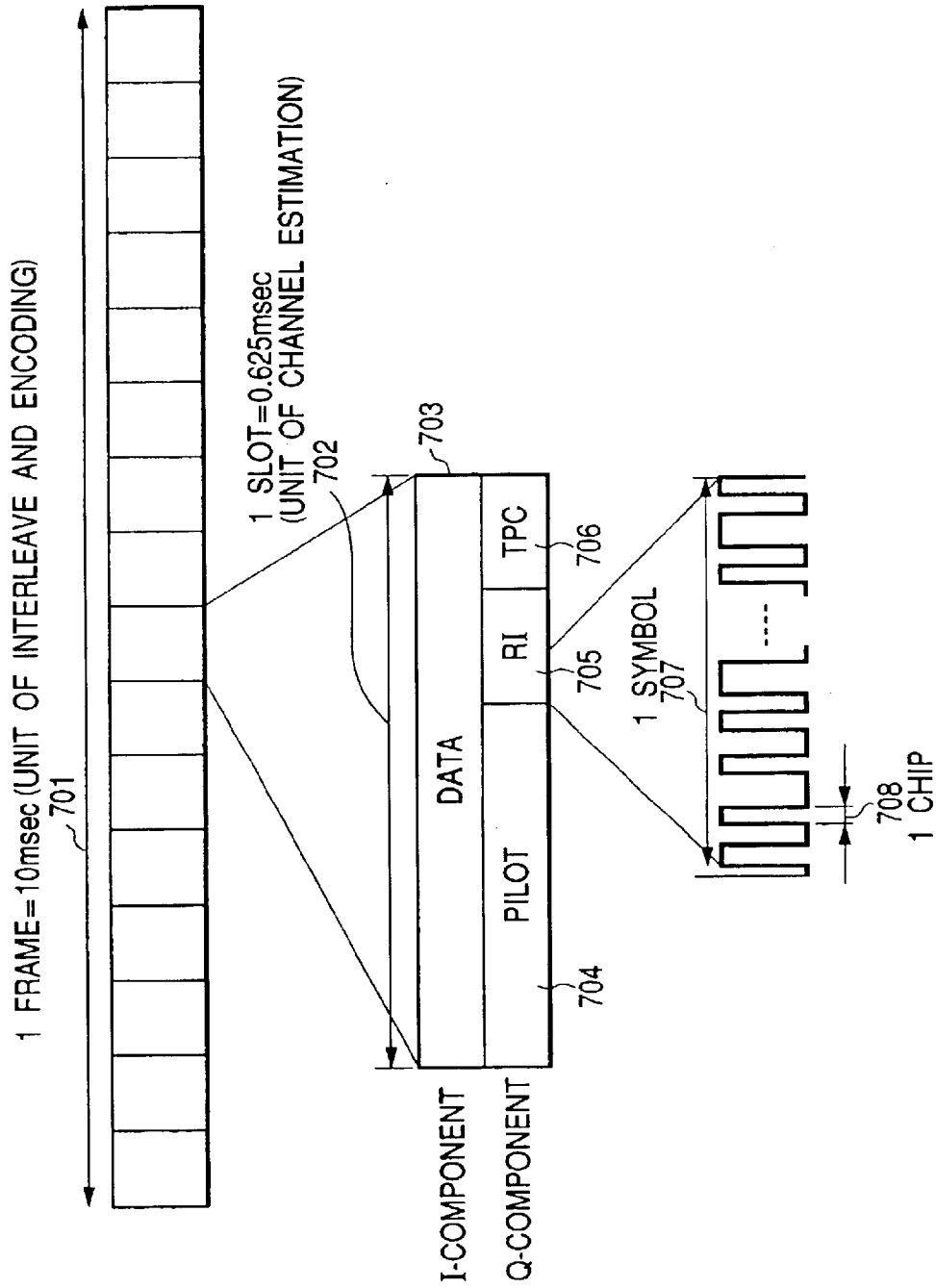
FIG. 7 is a diagram which shows a format of a physical channel in an uplink line of the W-CDMA method.

FIG. 7 shows a communication format of data transmitted from a mobile station to a base station with use of an uplink line in a W-CDMA system. One frame 701 (=10 msec) is a basic unit of a channel codec processing, such as interleaving, error correction encoding, etc. One frame is further divided into 16 slots. One slot 702 (=0.625 msec) is a basic unit of an interface control, such as channel estimation, transmission power control, etc. One slot is further divided into I content and Q content. The I content receives a data symbol 703 and the Q content receives such control symbols as a pilot signal 704. One symbol 707 is a basic unit of channel-codec-processed transmit data. In the CDMA system, this one symbol is multiplied by a pseudo random signal referred to as a PN series signal, thereby executing a spectrum diffusion processing. one chip 708 is a basic unit of pseudo random signals, and is the minimum unit in all the processings.

Hereunder, a first embodiment of the present invention will be described with reference to the accompanying drawings.

Figure 8:
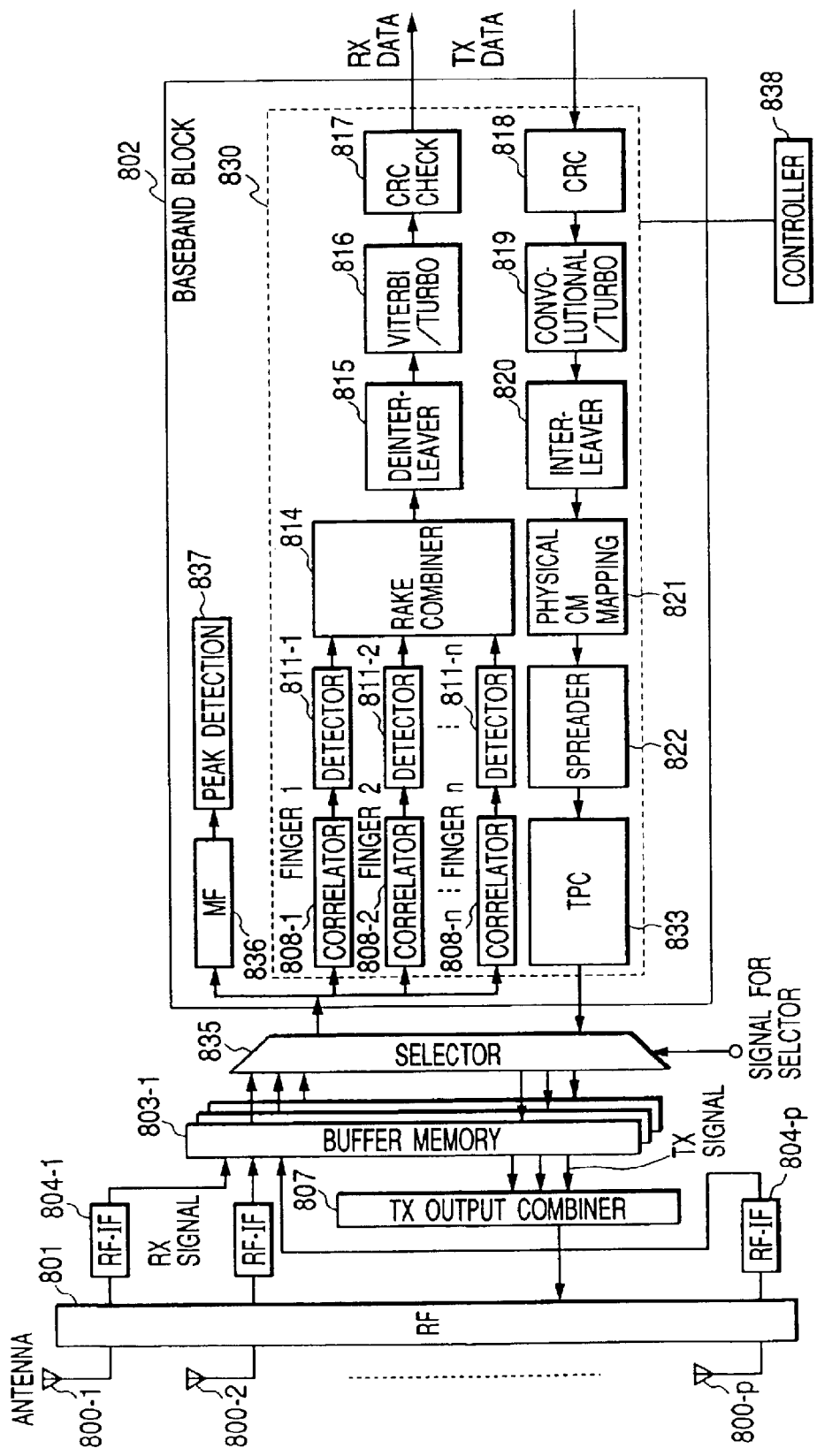
FIG. 8 is a block diagram of a base station representing a first embodiment of the present invention.

FIG. 8 shows a hardware block diagram of a base station in the first embodiment of the present invention.

Carrier frequency band signals received by antennas 800-1 to 800-p are converted to base band signals by an RF unit 801. The base band signals are then stored in buffer memories 803-1 to 803-3 provided so as to correspond to an antenna, respectively. These buffer memories also may be united into one memory consisting of a plurality of regions.

Each of the buffer memories 803-1 to 803-3 should be able to store data in a multiple of the maximum unit of modem processing (for example, one frame in the W-CDMA system). The capacity of each buffer memory is decided properly by a difference between the data rate of the RF channel and the calculation speed of the base band unit 802, as well as the number of channels processed in a multiplexing manner by the modem processing unit 830. In addition, the number of channels to be processed in a multiplexing manner by one base band unit is less than the (calculation speed of the base band unit/data rate of the RF channel).

Base band signals stored in the buffer memories 803-1 to 803-3 include all the multiplexed data of all the mobile stations in the subject sector service area. The multiplexed data is then read into the modem processing unit 830 repetitively so as to be demodulated, thereby the hardware size is reduced and the LSI calculation speed can be used effectively for demodulation. In addition, the modem processing unit 830 modulates transmit data repetitively and the generated base band transmit signals are stored in corresponding buffer memories so as to be classified by sector therein. The base band signals of all the channels, classified by sector and multiplexed in the LSI and stored in buffer memories 803-1 to 903-3, are combined in the output combination unit 807. In the output combination unit 807, all transmit signals from all LSIs of the subject base station are combined. Multiplexed base band transmit signals are converted to carrier frequency band transmit signals, and are then transmitted from the antennas 800. The hardware size can thus be reduced and the LSI calculation speed can be used effectively for the modulation of those signals.

Figure 9:
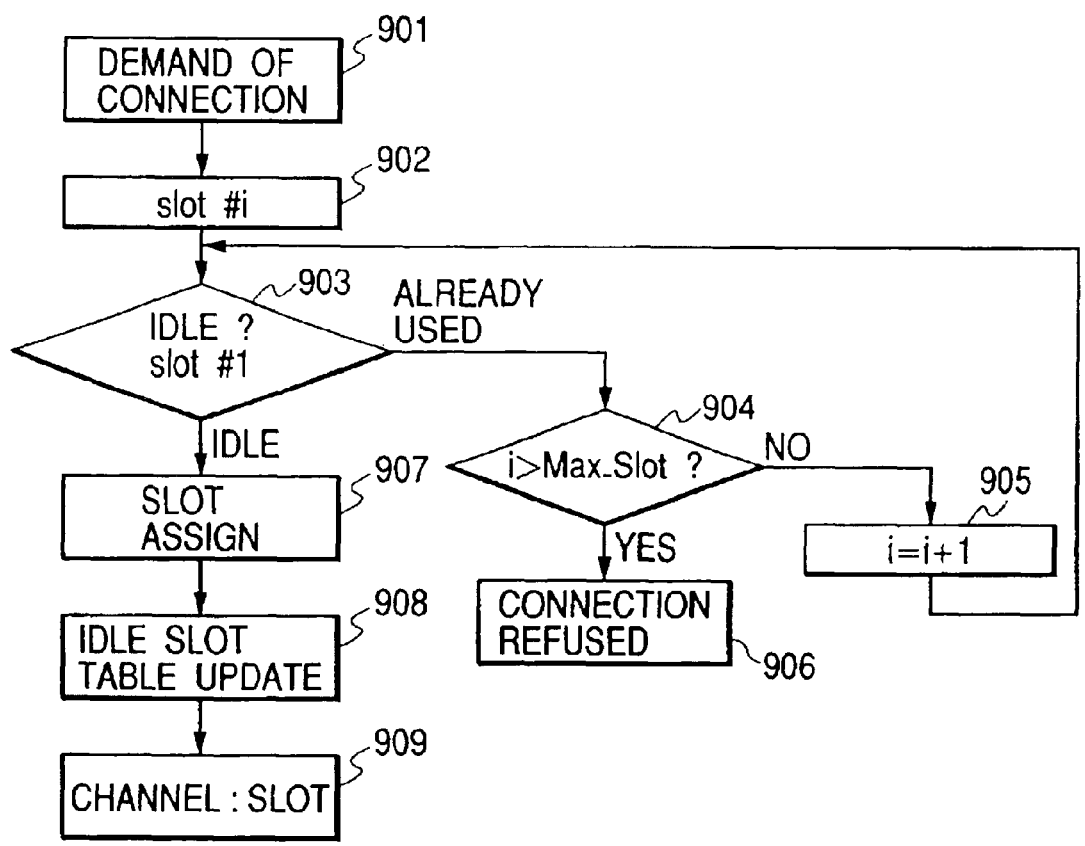
FIG. 9 is a flow diagram of the channel assign method when the hardware configuration shown in FIG. 8 is employed.

If the hardware configuration shown in FIG. 8 is employed, the channel assignment in the base station controller 838 becomes as shown in the sequence in FIG. 9. In this case, it is premised that the modem processing unit 830 is composed of only one hardware unit and the time is divided into a plurality of processing time units (slots); then, each slot is assigned to a channel to process, thereby channel processings are executed in a time sharing manner. The term "time sharing" mentioned here refers to a processing method in which one processing channel is switched to another at each processing time unit (slot) and the channel processing is executed exclusively in the processing time unit (slot).

In the channel assignment sequence shown in FIG. 9, at first, the base station controller checks idle slots beginning at the first slot. The controller, if finding a idle slot, assigns the slot as the channel processing time (907). If the first slot is not idle, the controller makes the same check for the next slot (903 to 905). If no idle slot is formed in such a check, the controller refuses the call connection (906). However, note that this method requires a management table used to denote a channel processing assigned to a slot (909). According to this channel assignment method, one slot can be assigned to a voice terminal and a plurality of slots can be assigned to a high speed data terminal, thereby coping with both voice and data terminal services with use of one hardware unit.

Next, a second embodiment of the present invention will be described.

Figure 10:
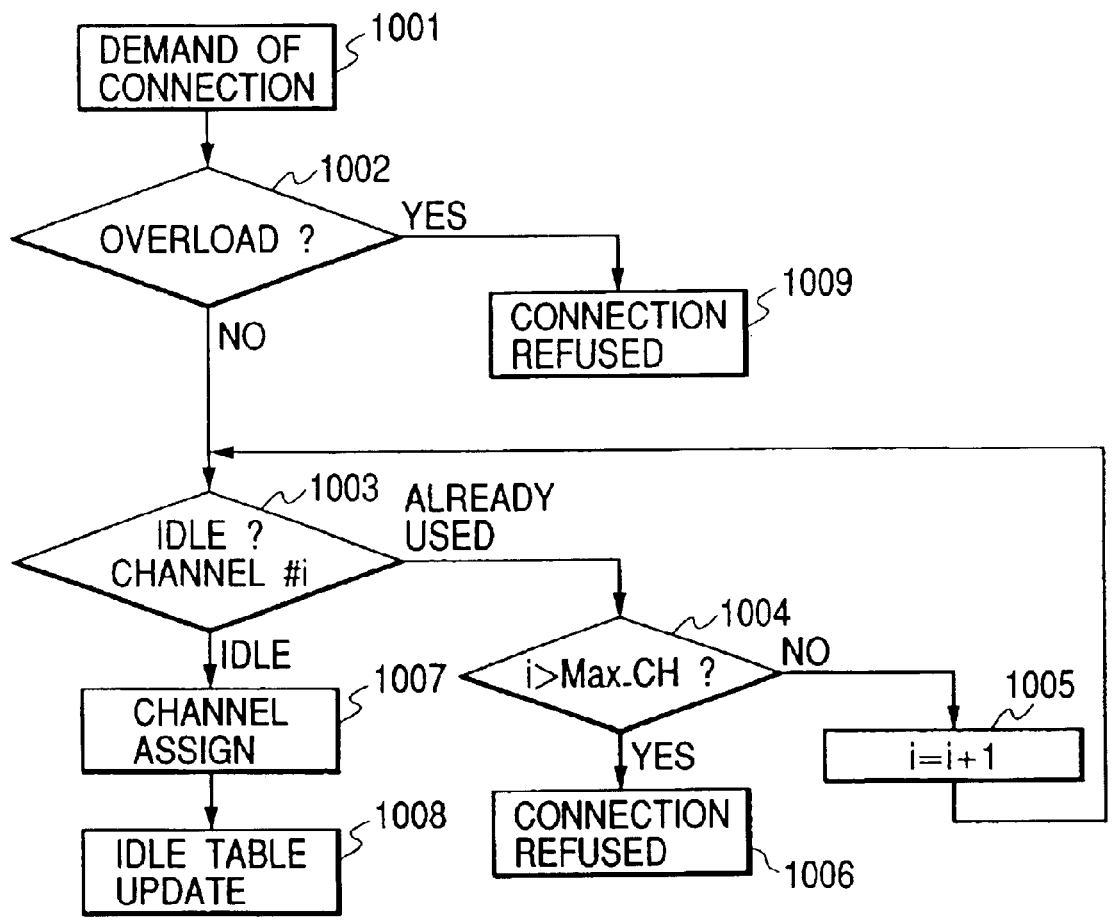
FIG. 10 is a flow diagram of the channel assign method for a second embodiment when the hardware configuration shown in FIG. 8 is employed.

FIG. 10 shows a flowchart of the channel assignment technique used in the second embodiment of the present invention. The base station configuration in FIG. 10 is the same as that shown in FIG. 8. However, the channel assignment method in the base station controller 838 takes a different sequence from that shown in FIG. 9. In FIG. 10, the modem processing unit 830 is composed of one hardware unit and the modem processing unit 830 is provided with a capacity sufficient to process a plurality of channels simultaneously with use of a software program for operating the hardware. Each channel processing state is managed by a flag and this flag is checked to determine the end of each processing unit, thereby processings of a plurality of channels are executed in a time multiplexing manner within a unit time. The term "time multiplexing" refers to a processing method in which data from a plurality of channels is stored in storage means, such as a memory, etc. beforehand, then a processing channel is switched according to a flag, thereby the channel processing is executed exclusively within the processing time; and, after the channel processing, the next channel data is read from the storage means and processed, thereby enabling a plurality of channels to be processed within the unit time.

In FIG. 10, at first, the controller checks the load of the modem processing unit 830, thereby checking the channel processing for overload (1002). The term "load" mentioned here is defined as an amount of software processing needed for processing a plurality of channels. The maximum processing amount in the modem processing unit is defined as an allowable load. The "overload" state is a state in which a load exceeding the allowable load is applied to the modem processing unit and the subject processing cannot be ended perfectly within the unit time.

The processing load of the modem processing unit 830 may be determined as follows: the controller checks an approximate load value of the modem processing unit 830, which is to be applied to one channel beforehand, then updates the load according to the known load value each time a new channel is assigned or the controller 838 may exchange control signals with the modem processing unit 830 so as to determine the load of the modem processing unit 830.

If it is judged that there is no overload as a result of the check, a channel is assigned (1003 to 1008). If it is judged that an overload exists, the controller rejects the call (1009).

According to the method described with reference to FIG. 10, flag management is employed for processing a plurality of channels. Consequently, one hardware unit can provide both voice and data terminal services so as to cope with the maximum possible processing capacity.

Next, a third embodiment of the present invention will be described.

Figure 11:
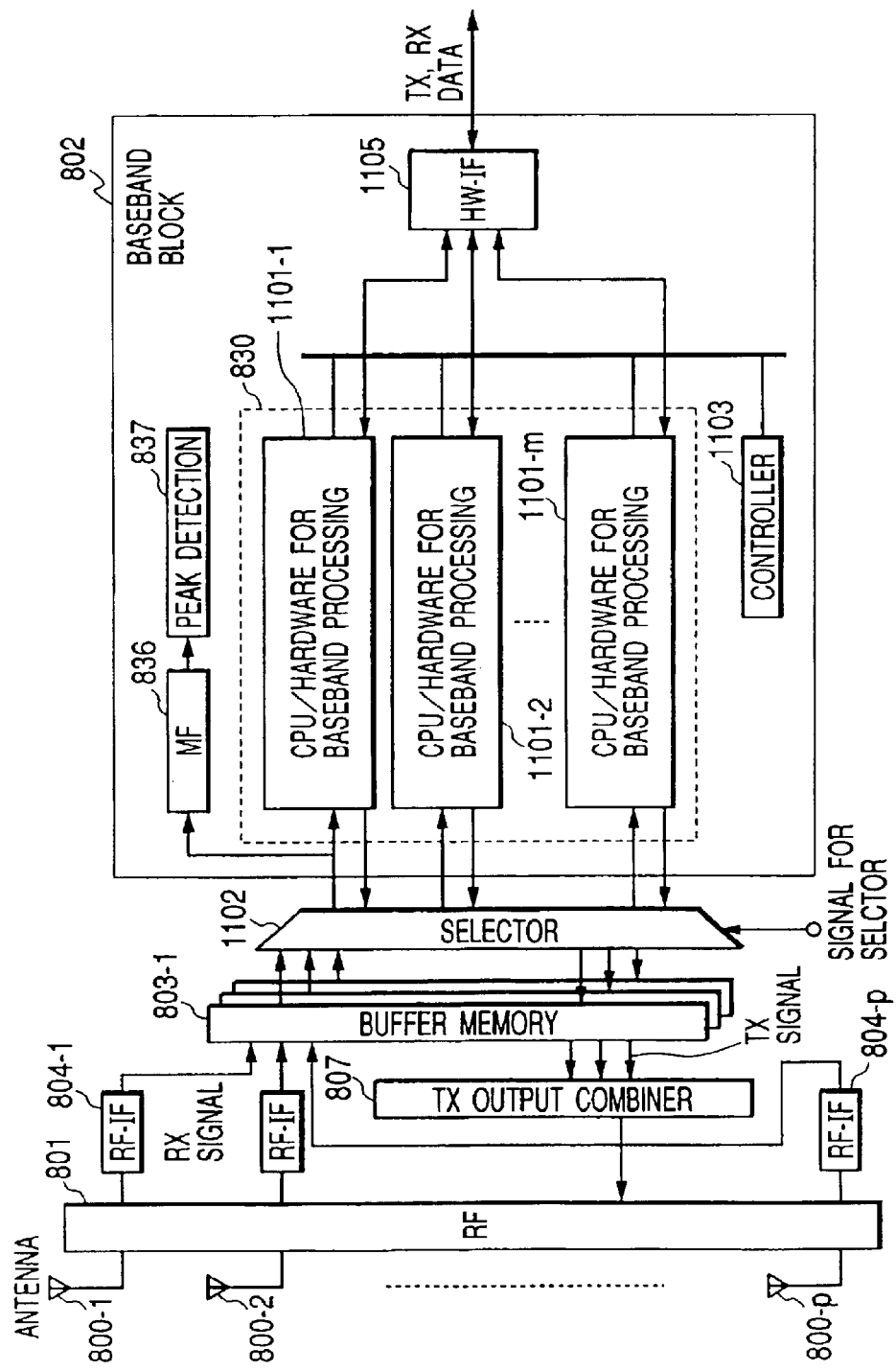
FIG. 11 is a block diagram of the base station representing a third embodiment, in which a modem processing unit is composed of a plurality of hardware units.

FIG. 11 shows a hardware block diagram of a base station in the third embodiment of the present invention. In FIG. 11, only the method for composing the modem processing unit 830 differs from that shown in FIG. 8. More concretely, although one modem processing unit processes all the channels supported in the base station in FIG. 8, a plurality of base band processing CPU/base band processing hardware units 1101-1 to 1101-m are used to process those channels in FIG. 11. This is the only difference between FIG. 8 and FIG. 11.

Figure 12:
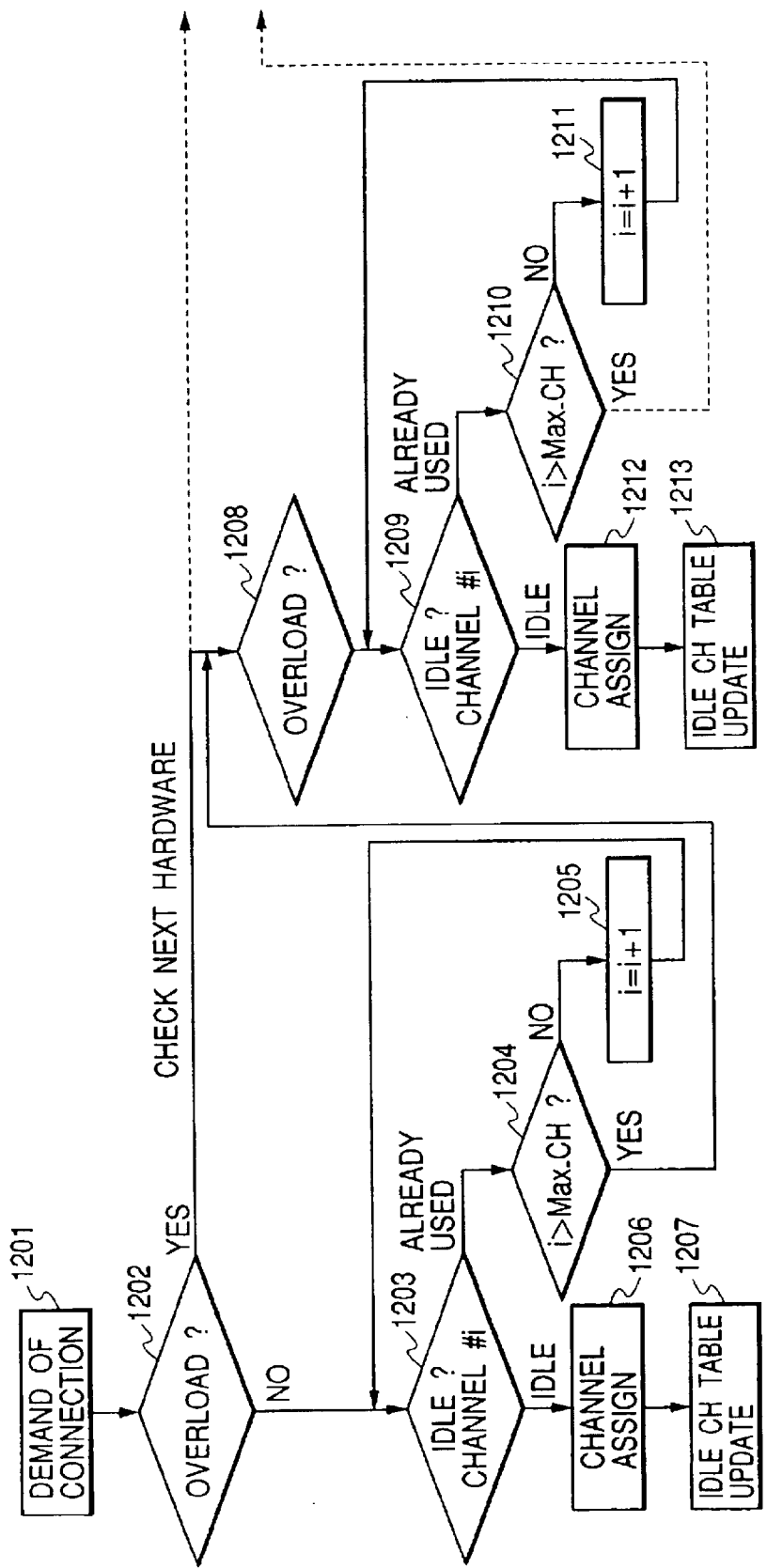
FIG. 12 is a flow diagram of a channel assignment method when the hardware configuration shown in FIG. 11 is employed.

If the hardware configuration shown in FIG. 11 is employed, the channel assignment in the base station will be as shown in the sequence in FIG. 12. Concretely, upon receiving a call request, the controller checks the load of the modem processing unit (1202). If the state is an overload, the controller checks the next modem processing unit hardware (1208) to see if the use of the hardware is expected to cause overload in the object processing. If not, the controller checks the hardware for a idle channel (1209). If an idle channel is found, the controller assigns the channel (1212). If no idle channel is found and the use of the hardware is expected to cause overload in the processing, the controller further checks the next modem processing unit hardware.

Because the channel assign method shown in FIG. 12 uses a function for checking the software for processing a plurality of hardware units for overload, the processing load can be dispersed properly.

Next, fourth embodiment of the present invention will be described.

Figure 13:
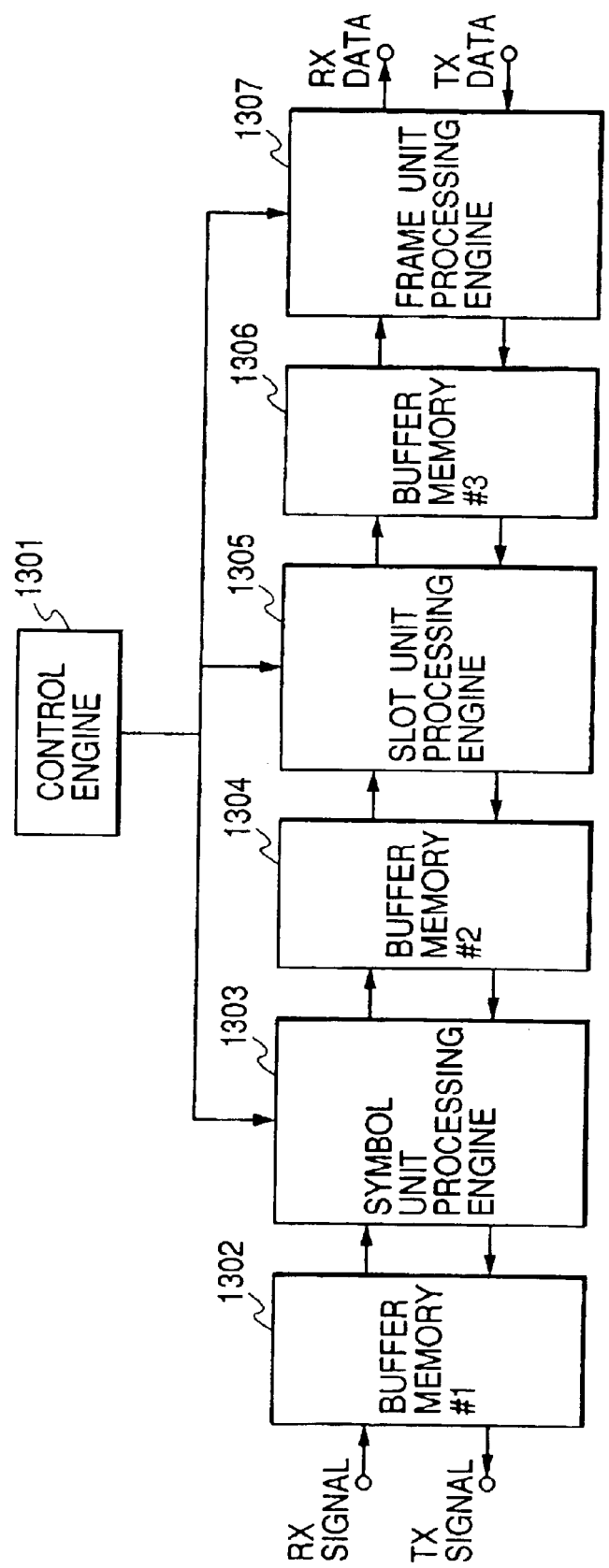
FIG. 13 is a block diagram of a base band unit that employs the engine method for a fourth embodiment of the present invention.

FIG. 13 shows a block diagram of a base station base band unit in the fourth embodiment of the present invention. This hardware configuration is determined by turning attention to the processings to appear in units of a symbol, a slot, and a frame.

In this embodiment, a modem processing block is divided into processing units and each processing block is composed so as to be operated independently. If processings whose processing units are different from each another are executed one by one, the symbol unit processing speed determines the whole processing speed, thereby slot and frame processings whose processing units are large degrade the use efficiency of the hardware. To avoid such a problem, processings having the same processing unit are grouped in a block in this embodiment. Then, by setting an operation speed of each block or plural blocks in parallel, the use efficiency of the whole hardware is improved. For example, a plurality of symbol interval calculation engines 1303 are disposed in parallel in FIG. 13. Otherwise, the slot interval calculation engine 1305 is operated faster than the frame interval calculation engine 1307.

Base band received signals are stored in the first buffer memory 1302 in multiple of a symbol, which is a processing unit of the symbol interval calculation engine 1303. In order to fix the processing switching timing, a fixed amount of received signals are entered to the base band unit even when one symbol length differs among channels. For example, if the length of one symbol for a channel whose symbol interval is the largest is determined to be a processing unit, channels are switched for one symbol at least (the maximum symbol interval in the W-CDMA) and for 16 symbols at a maximum (the minimum symbol interval in the W-CDMA) for processing.

The symbol interval calculation engine 1303 is a block for executing a modem processing for each symbol. The symbol interval calculation engine 1303 exchanges data with the slot interval calculation engine 1305 through the second buffer memory 1304. The second buffer memory 1304 stores data in a multiple of one slot, which is a processing unit of the slot interval calculation engine 1305 so as to prevent a received signal that is not processed yet from being overwritten by another signal. The second buffer memory 1304 is prepared for each channel.

The slot interval calculation engine 1305 is a block for executing a modem processing slot by slot. The slot interval calculation engine 1305 exchanges data with the frame interval calculation engine 1307 through the third buffer memory 1306. The third buffer memory 1306 is also prepared for each channel and stores data in a multiple of a frame.

The frame interval calculation engine 1307 is a block for executing a modem processing frame by frame. The frame interval calculation engine 1307 is also used for an interleaving processing, etc. to be executed in units of more than one frame.

The control engine 1301 controls each engine. Each of the engines 1303, 1305, and 1307 executes a modem processing asynchronously relative to each other under the control of the control engine 1301. Each channel is also processed independently by each engine. Consequently, it is possible to execute modem processings for a plurality of channels in a time-multiplexing manner, thereby improving the processing efficiency of the whole hardware.

Figure 14:
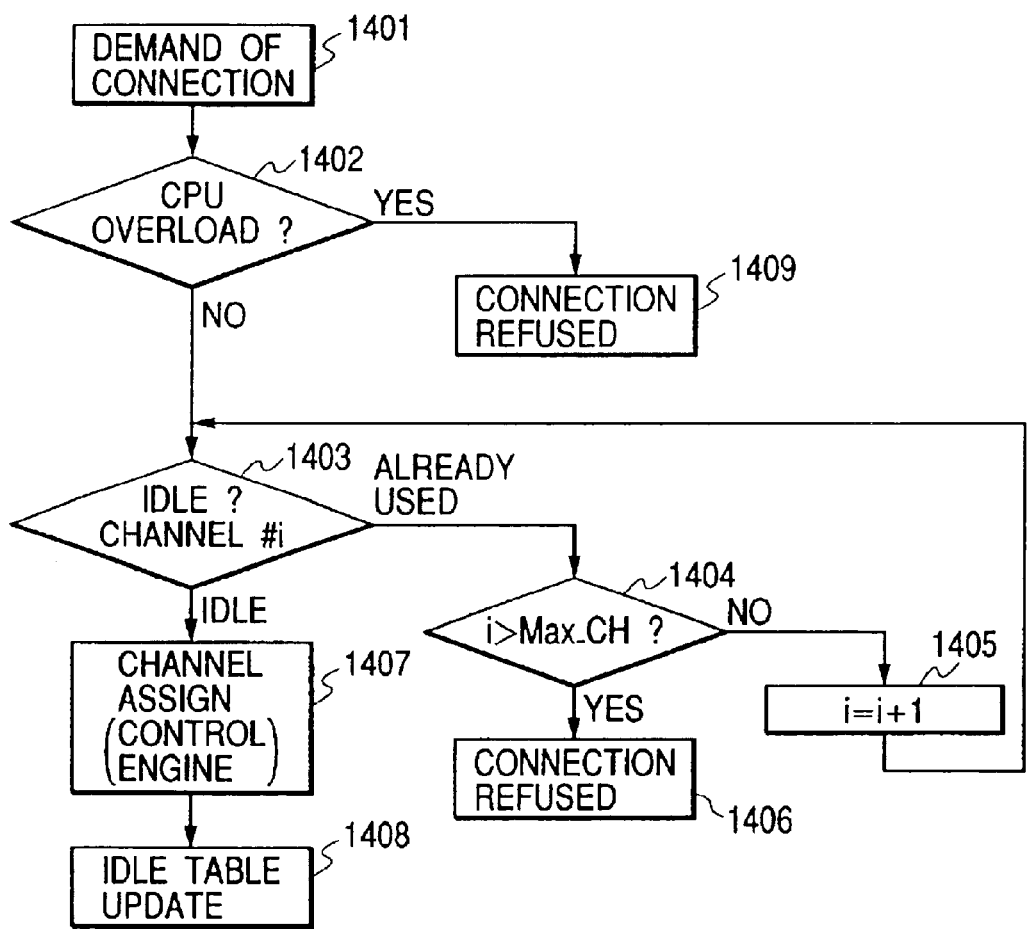
FIG. 14 is a flow diagram of a channel assignment method employed for a controller when an engine method is employed.
Figure 15:
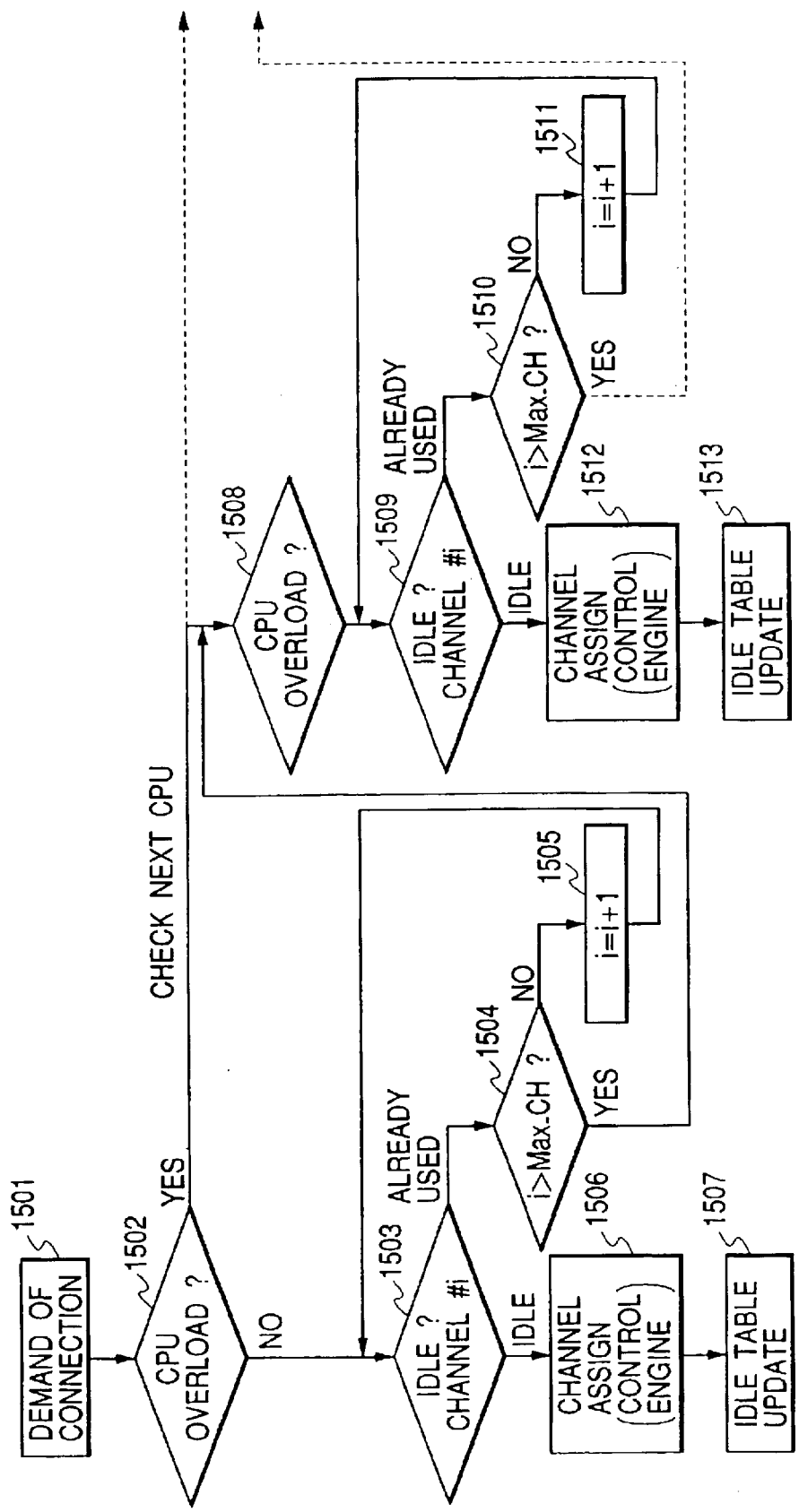
FIG. 15 is a flow diagram of a channel assignment method employed for the controller when an engine method is employed for a plurality of hardware units as shown in FIG. 11.

If the hardware configuration shown in FIG. 13 is employed, the channel assignment in a base station will be as shown in FIGS. 14 and 15. FIG. 14 shows a channel assignment method when the base station is composed of only one base band unit, which employs an engine method. FIG. 15 shows a channel assignment method when the base station is composed of a plurality of base band units, each employing an engine method.

The channel assignment in the base station controller will be as shown in FIG. 14. At first, the controller checks the object engine CPU for overload when a call request is detected (1402). If the CPU is not overloaded, the controller finds an idle channel. If it is found, the controller assigns the channel to the control engine 1401 (1407). At this time, the base station controller is only requested to instruct the control engine 1301 to assign a channel (1407). Thus, the control engine 1301 divides the channel processing into the symbol interval calculation engine and the slot interval calculation engine and schedules those processings. If there is no idle channel, the controller checks the next channel (1403 to 1405). If all the channels are busy, the call is rejected.

In the case of FIG. 15, there is a plurality of base band units, each employing an engine. method. Consequently, the controller checks the first CPU for overload when a call request is detected (1502). If the CPU is overloaded, the controller checks the next CPU for overload (1508). If the CPU is not overloaded, the controller assigns a channel to the CPU. If the CPU is also overloaded, the controller checks the next CPU for overload in the same way and attempts to assign a channel to the CPU.

The channel assignment method as shown in FIG. 15 is thus effective to disperse the processing load of the system hardware, since the method is provided with a function for checking a plurality of CPUs for overload.

In order to shorten the time required for controlling channel assignment, a channel should preferably be assigned to each hardware evenly. This is because it is possible to end channel assignment earlier if a channel is assigned to each CPU so as to reduce the number of nearly overloaded CPUs while CPUs are checked for overload sequentially in the control flow. If the function for checking each CPU for overload as shown in FIG. 15 is optimized for the CPU so as to disperse the load, the channel assignment method described above will make it possible to reduce the channel assignment time successfully.

Furthermore, it should be avoided to operate a plurality of hardware units from the point of view of power consumption; only the minimum necessary number of hardware units should be used. In this case, the function for checking overload as shown in FIG. 15 may be optimized to minimize the power consumption, thereby the channel assignment method will be able to reduce the power consumption.

The channel assignment method shown in FIGS. 14 and 15 are almost the same as that (FIGS. 10 and 12) when the hardware configuration shown in FIGS. 8 and 11 is employed. According to the evaluation on the basis of the hardware usage efficiency, however, the hardware configuration, when an engine method is employed, will be much more efficient.

Next, a fifth embodiment of the present invention will be described.

Figure 1:
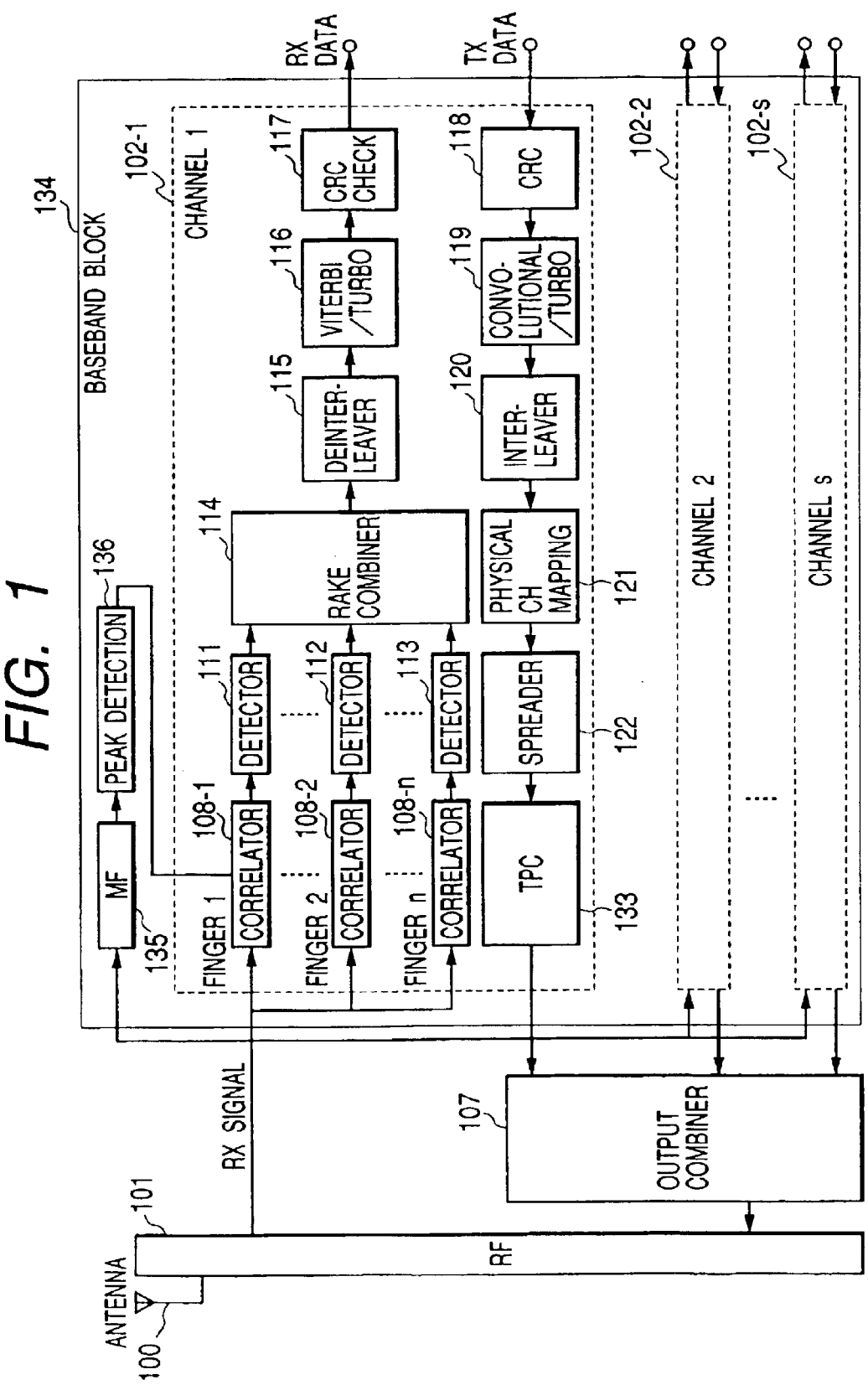
FIG. 1 is a block diagram of a conventional base station.
Figure 2:
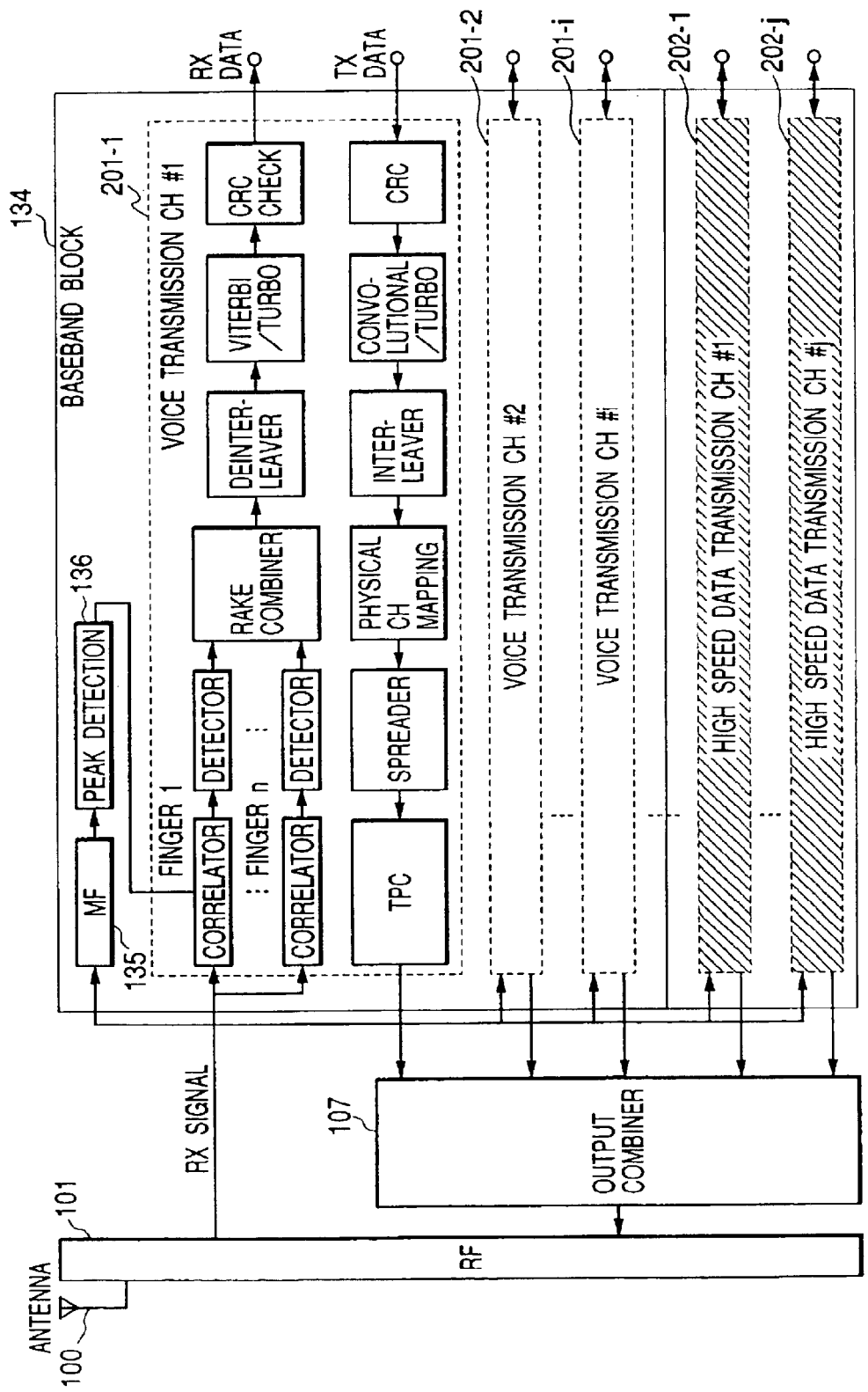
FIG. 2 is a block diagram of a conventional base station supporting both voice and high speed data communications with use of hardware units for both communication types.
Figure 3:
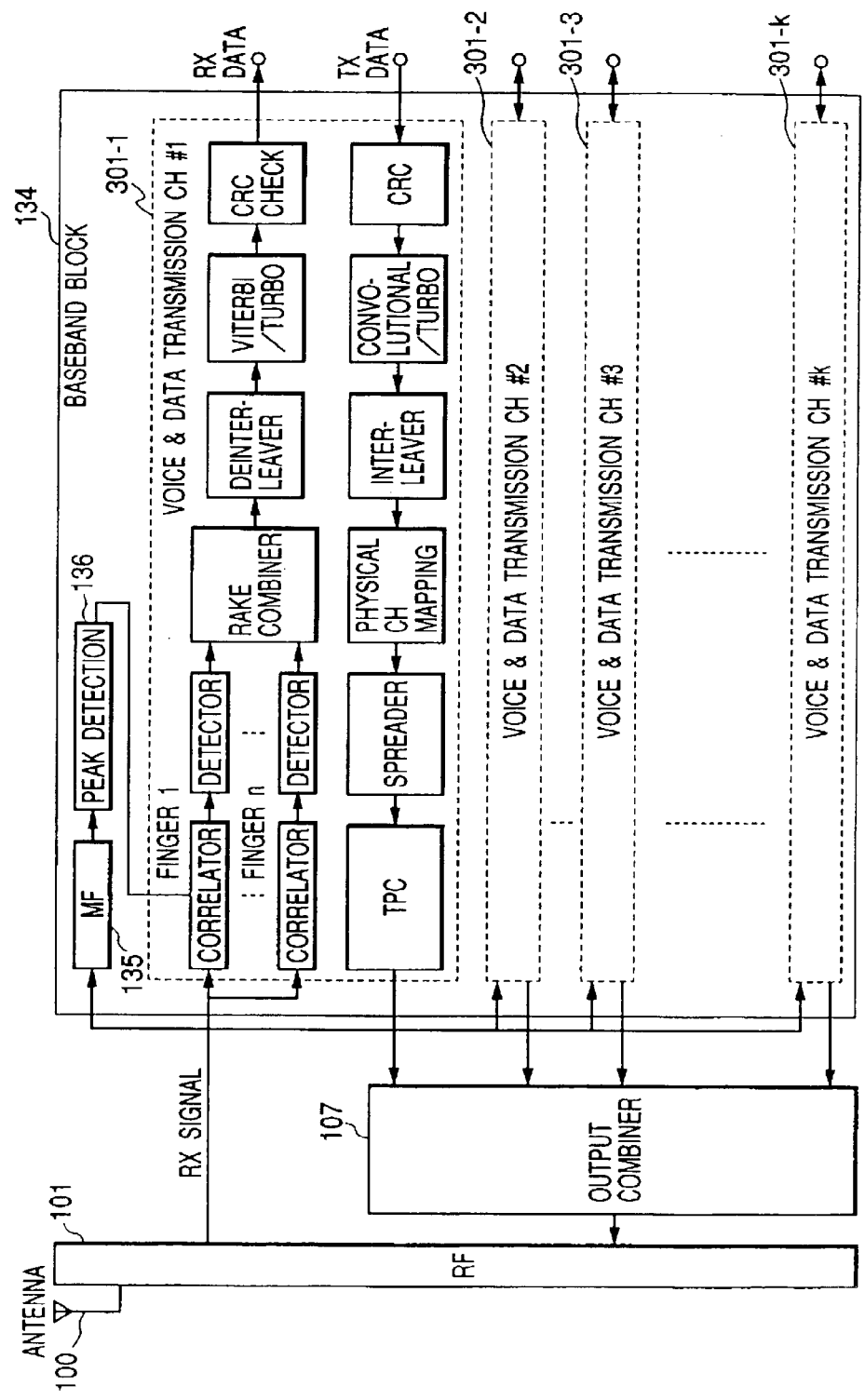
FIG. 3 is a block diagram of a conventional base station for realizing both voice and high speed data communications with use of a large size and high speed hardware unit that can cope with both communication types.
Figure 4:
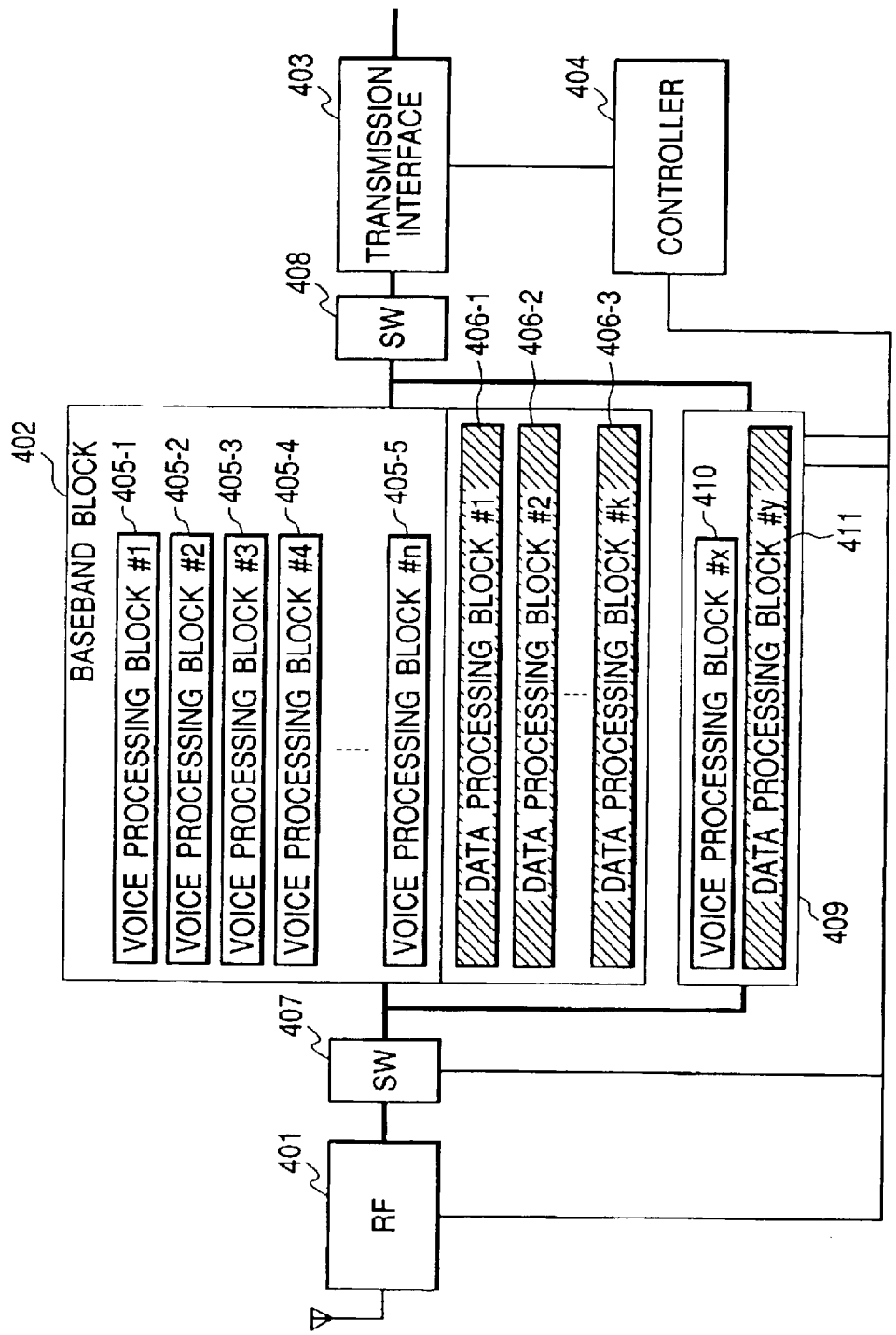
FIG. 4 is a block diagram of a conventional base station that adds a spare running system to the base band unit configuration shown in FIG. 2, thereby realizing a fault-tolerant system.

Taking the fault-tolerant property of a base station into consideration, the conventional method has provided a spare hardware, as shown in FIG. 4, so as to assure the safety of the system. Switching control to the spare hardware has thus been needed. If a base station employs an engine method, however, it is only required to more hardware units than the number of users supported by the system. The engine method divides the processing by the processing time unit, thereby data can be processed regardless of the user's communication type (voice/data communication). More concretely, the spare hardware can be used for both voice and data communications or for mixed communications of voice and data.

Figure 16:
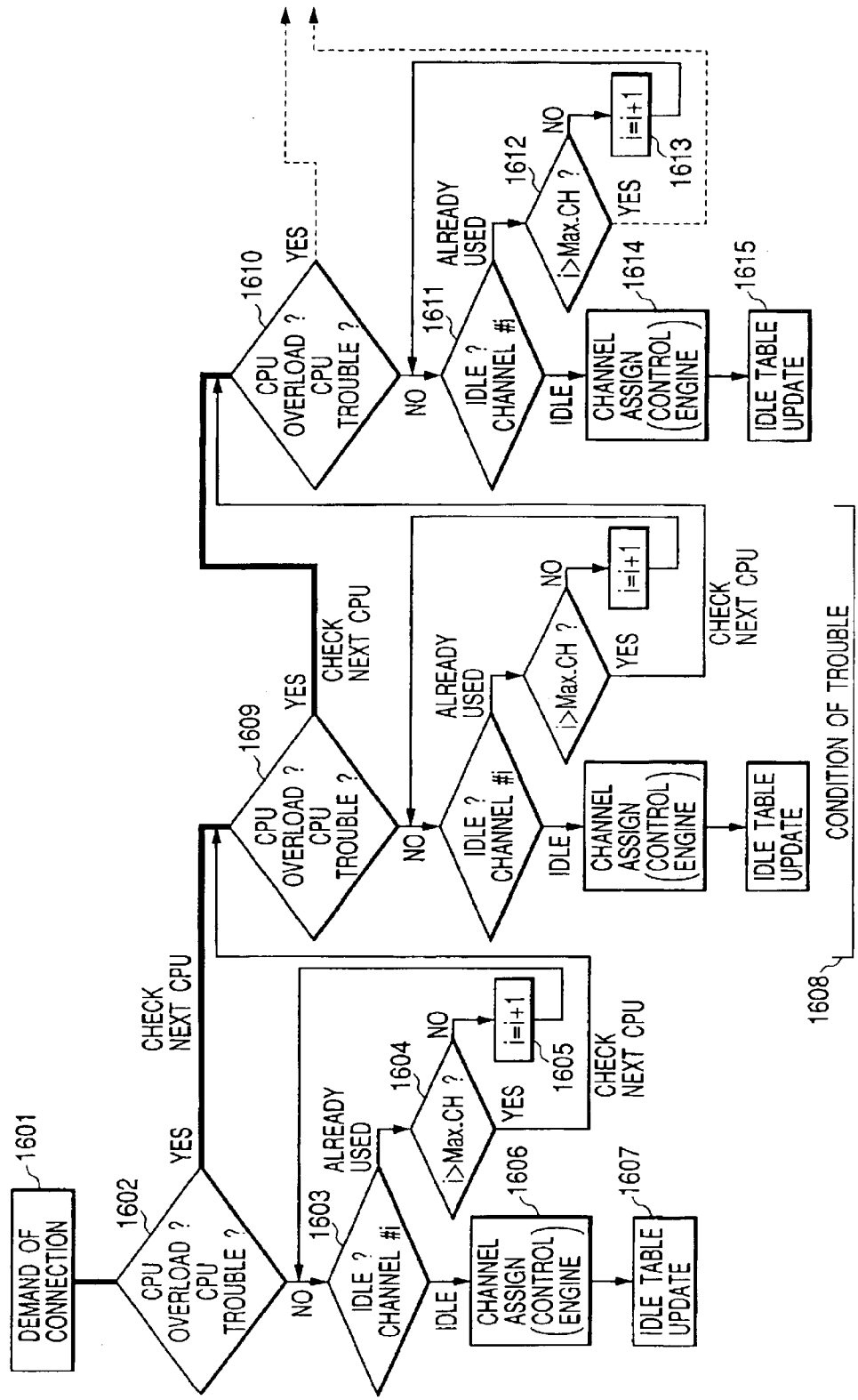
FIG. 16 is a flow diagram which shows how a fault-tolerant system is realized due to the channel assignment employed for the controller when an engine method is employed for a plurality of hardware units as shown in FIG. 11 for a fifth embodiment of the present invention.

The control of channel assignment in such a processing will become as shown in FIG. 16. The channel assignment is the same as that shown in FIG. 15. Because the CPU load check is not done correctly for the hardware 1608, which is down, channel assignment is carried out for the next hardware (CPU) by avoiding the down hardware 1608, thereby achieving a fault-tolerant property against hardware faults.

As described above, according to the present invention, the hardware and the channel assignment method with use of the hardware can make it possible to reduce the hardware in size and disperse the processing load of the hardware, thereby making it easy to construct a system for realizing fault-tolerance properties easily.

Next, a hand-over processing according to the present invention will be described as the sixth embodiment of the present invention.

In the sixth embodiment, a code-division multiple connection base station apparatus is employed. The apparatus is provided with a plurality of base band processing CPU/base band processing hardware units (1101-1 to 1101-m) as shown in FIG. 11. Signals received by each of a plurality of antennas (800-1 to 800-p) are converted to base band signals in the RF unit (801) and transferred to one of the m base band processing CPU/base band processing hardware units (1101-1 to 1101-m) through an RF interface (804-1 to 804-p), a buffer memory (803), and a selector (1102) Each of the m base band processing CPU/base band processing hardware units (1101-1 to 1101-m) can have r channels, so that the entire base station comes to have m×r channels at a maximum. The received signals, converted to base band signals, are transmitted to a base station controller through an HW-IF (1105).

On the other hand, transmit signals are transferred to one of the m base band processing CPU/base band processing hardware units (1101-1 to 1101-m) through the HW-IF (1105). The transmit signals, converted to base band signals, are transmitted from antennas (800-1 to 800-p) through a selector (1102), a buffer memory (803), and further through the output combination unit (807) and the RF unit (801).

Figure 5:
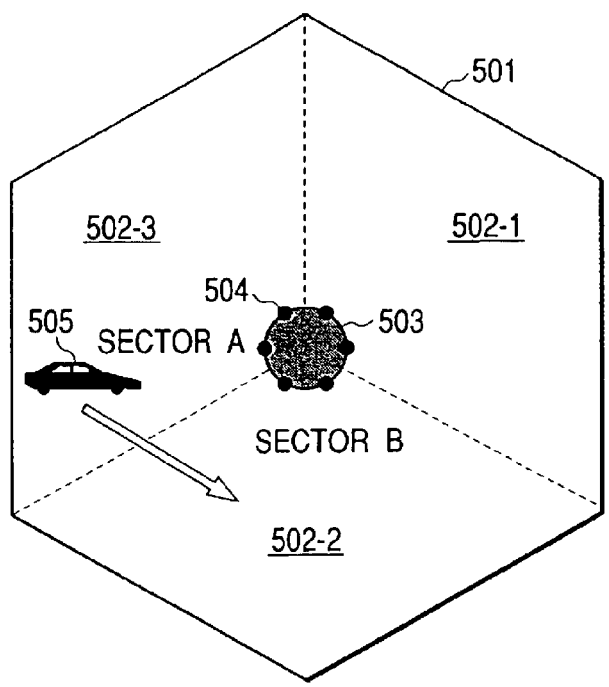
FIG. 5 is a diagram which shows a base station divided into a plurality of sectors with use of directional antennas.
Figure 6:
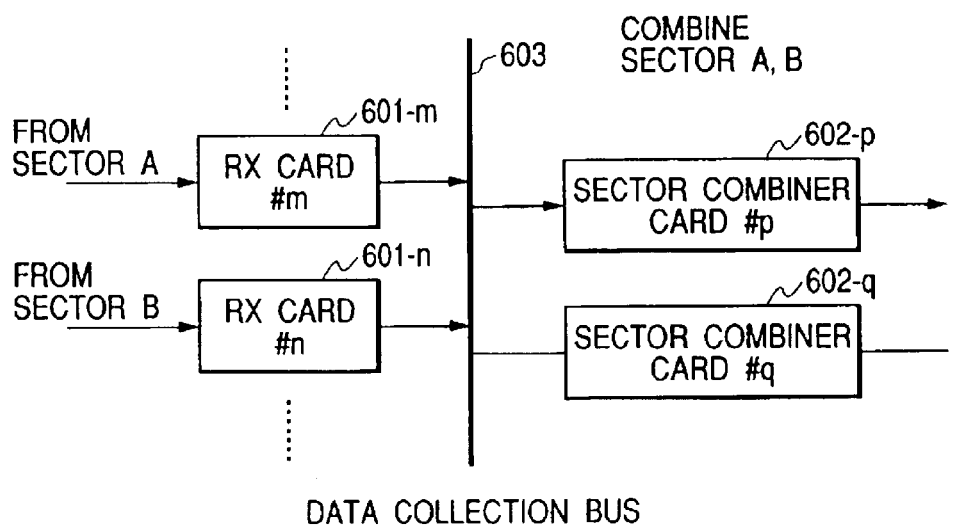
FIG. 6 is a block diagram of a conventional base station supporting a hand-over processing.

In FIG. 5, if a mobile station (505) outputs a hand-over request so as to begin exchanges of signals with a sector B (502-2) in addition to the sector A (502-3) with which the mobile station (505) has exchanged signals so far, then the base station must set a channel for the sector B (502-2). At this time, the code-division multiple connection mobile communication base station apparatus of the present invention can cope with the processing with use of its function for enabling the same base band processing CPU/base band processing hardware (1101-1 to 1101-n) to hold both a source mobile channel and a destination mobile channel.

Hereunder, the base band processing CPU/base band processing hardware (1101-m) will be referred to as LSI #m and the mobile source channel as a channel A, and the mobile destination channel as a channel B so as to simplify the description.

The channel B is set with any of the procedures (1) to (4) according to the state of the base band processing CPU/base band processing hardware in the base station.

(1) If the LSI #m holding the source channel A still has a margin for holding a destination channel B, the destination channel B is set in the LSI #m as it is.

(2) If the LSI #m holding the source channel A does not have a margin for further holding the destination channel B and another LSI #n has a margin for holding both channels A and B, the channel B is set in the LSI #n and the assignment of the source channel A is changed to the LSI #n.

(3) If the LSI #m holding the source channel A does not have a margin for further holding the destination channel B, and any of the other LSIs, which do not have a margin for holding both channels A and B now, can hold both channels A and B in the same LSI by changing the channel assignment to the present LSI one or more times, then the channel assignment to the LSI is changed so that both channels A and B are assigned to one and the same LSI.

(4) If it is impossible to assign both channels A and B to the same LSI even by changing the channel assignment to the present LSI, then "hand-over disabled" is reported to the base station controller.

Figure 17:
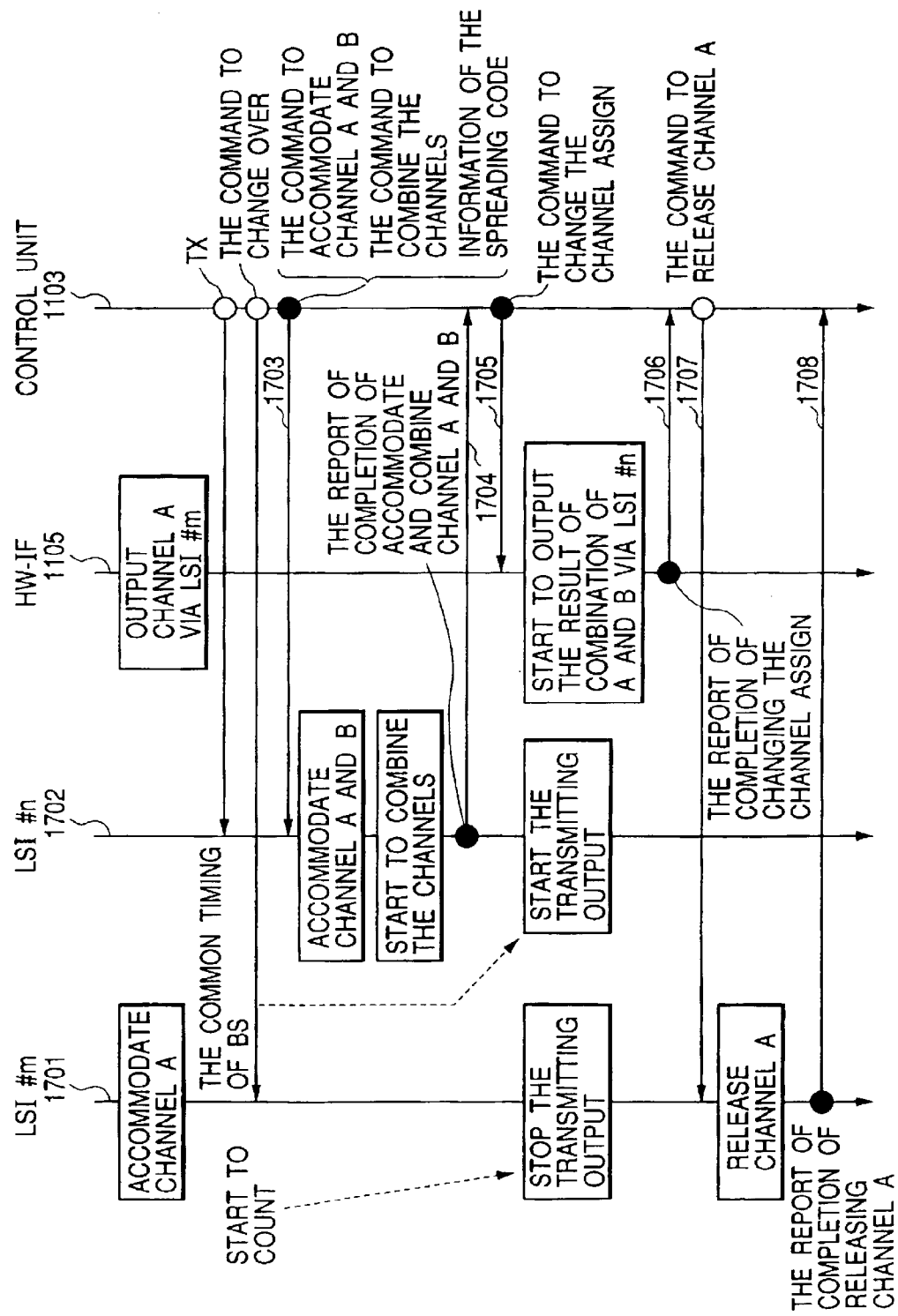
FIG. 17 is a flow diagram which shows a signal combination procedure over sectors for a sixth embodiment of the present invention.

For the procedure (2) or (3), the channel assignment to the present LSI must be changed to a different LSI. FIG. 17 shows such a reassignment especially for the procedure (2) For the procedure (2), when the channel B is set, the channels A and B must be combined so as to output the combined signal. For the procedure (3), resetting of the channel assignment to each LSI can be completed by repeating the same channel assignment change procedure as that in (2).

The function for combining signals over sectors in the same LSI by moving a channel between LSIs is realized through communications of control signals among the controller (1103), each LSI, and the HW-IF (1105). Of the control signals shown in FIG. 17, those indicated with black circles are used to change channel assignment.

The controller (1103), when receiving a channel assignment change request, transmits commands for holding both channels A and B, as well as for combining signals over sectors (1702) and transmits the spreading codes of both channels A and B necessary to hold them (1-703) to the LSI#n. The LSI#n (1702), after holding the channels A and B and outputting the completion signal indicating combination of both channels successfully, transmits the completion report to the controller (1103) (1704). The controller (1103) then notifies the HW-IF (1105) of the change of channel assignment (1705). Notified of the change, the HW-IF (1105) switches the output of the signal from the mobile RF station (505) to the line from LSI#m (1701) to LSI#n (1702) and notifies the controller (1103) of the completion of the assignment change (1706). Finally, the controller (1103) instructs the LSI#m (1701) to reset the assignment of the channel A (1707). The LSI#m thus resets the assignment and notifies the controller (1103) of the completion. Receiving the completion report (1103), the controller (1103) completes the channel movement between LSIs and the combination of signals between sectors (1708). This procedure can thus enable seamless channel movement between LSIs as described above.

Figure 18:
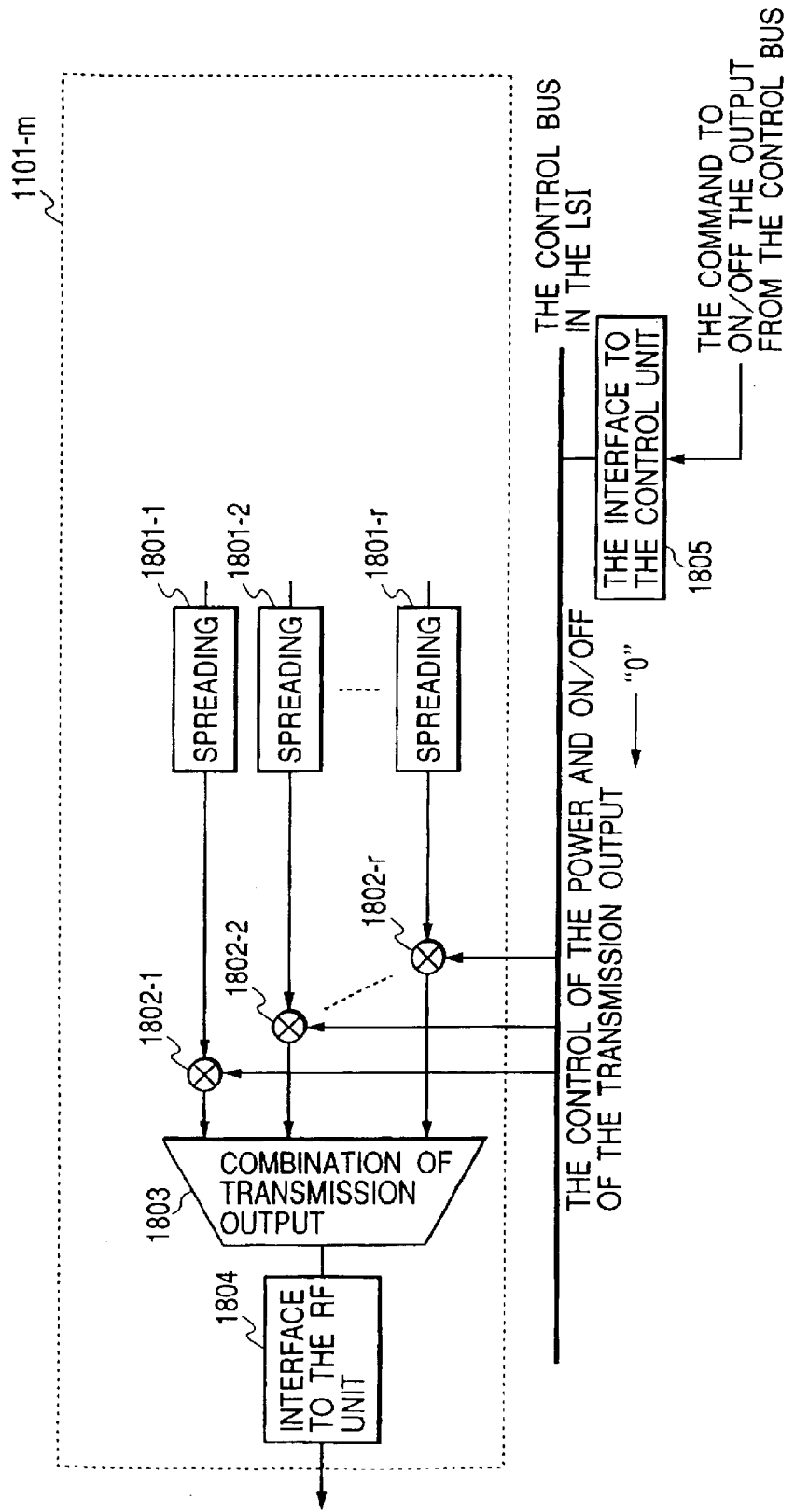
FIG. 18 is a block diagram of a downlink channel transmission on-off mechanism employed in the sixth embodiment of the present invention.

On the other hand, if both uplink and downlink channels are processed in the same LSI so as to control the signal transmission output, the same function and the same procedure for seamless movement of channels between LSIs are required for the downlink channel. In the base station, however, signals of a downlink channel, which is at the transmission side, are output from the LSI after the signals are combined with those of the other downlink channels, so it is difficult in the uplink channel to select each channel by on-off control of the transmission output after the signal is output from the LSI just like in the HW-IF (1105). Consequently, the output on/off control for each channel is done before addition/combination of the transmit signals in the LSI. FIG. 18 shows this function. FIG. 18 represents the transmission side output unit of one base band processing CPU/base band processing hardware unit. Numerals 1801-1 to 1801-r denote spreading modulators for r channels. After the spreading, the r channels are multiplied for the output power by multipliers (1802-1 to 1802-r) and added up and combined in the output combination unit 1803, then output from the LSI through the transmission/receiving IF 1804. The output power is specified by the controller provided outside the LSI through the controller IF 1805. If "0" is specified for the output power, the output of any downlink channel can be turned off. More concretely, if "0" can be output as an output power, the output control mechanism for controlling the output of each channel can also be used as an output on/off mechanism of each channel.

Figure 19:
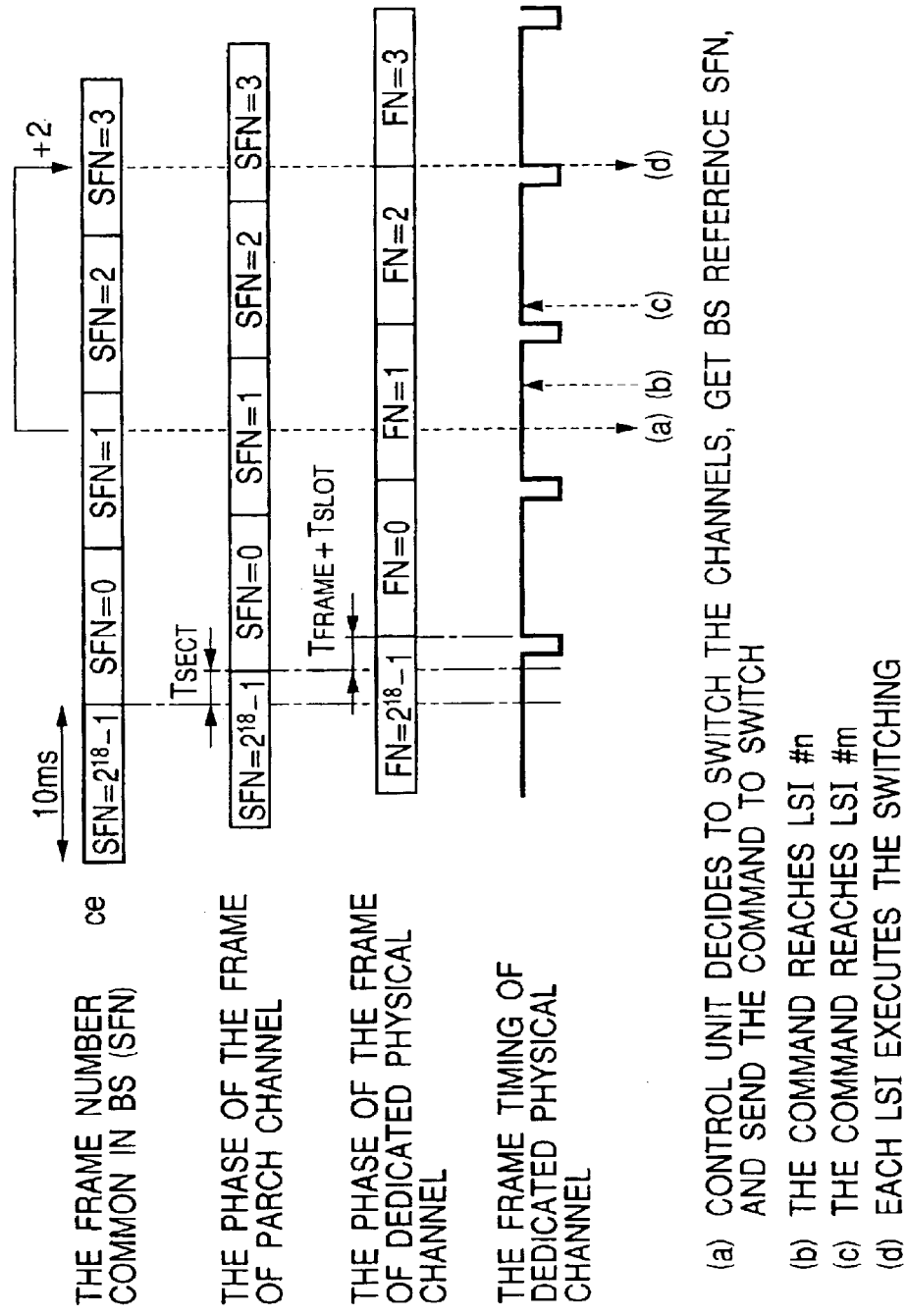
FIG. 19 is a diagram which shows timings of the movement of a downlink channel among LSI's in the sixth embodiment of the present invention.

In order to turn on/off a transmit signal so as to be synchronized between different LSIs after a spreading modulation processing as shown in FIG. 18, thereby switching channels, the switching command must be synchronized between those LSIs. This synchronization is enabled with use of a timing signal used commonly in the entire base station. In this embodiment, a frame number used commonly in the whole base station is used especially as such a timing signal. FIG. 19 shows switching timings for moving a downlink channel from LSI to LSI. However, sometimes a difference occurs between arrival times of a switching command issued by the controller between different LSIs at the timing (a) in FIG. 19, thereby the switching command arrives in LSI#n and LSI#m with a frame timing therebetween as shown in (b) and (c). If the channel switching execution timing is set at "when the switching command arrives" or "at the first frame timing after the switching command arrives", the arrived switching command execution timing differs between (b) and (c), thereby the simultaneous channel switching with precision of chip timing is disabled. If the channel switching timing is set "at a frame timing (d) when the frame number used commonly in the whole base station is incremented by 2 from the timing (a)", the switching timing can be synchronized between both LSIs in each chip even when a frame timing is set between (b) and (c) as shown in FIG. 19.

As described above, it is possible to change the assignment of both uplink and downlink channels to an LSI, thereby both source and destination channels can be held in the same base band processing CPU/base band processing hardware.

Figure 20:
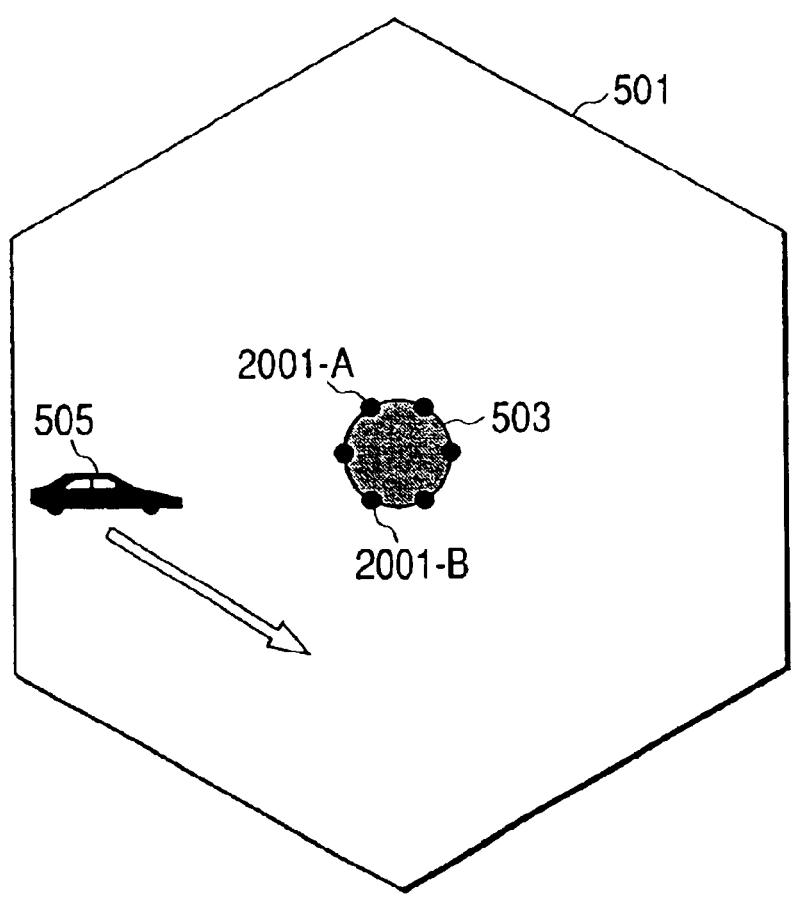
FIG. 20 is a diagram which shows how a base station communicates with a mobile station provided with a function for transmitting and receiving signals with use of a plurality of frequencies.

Next, a seventh embodiment of the present invention will be described. In this seventh embodiment, the base station in the sixth embodiment communicates with a mobile station provided with a function for transmitting/receiving signals simultaneously with use of a plurality of frequencies. The base station in this case is composed as shown in FIG. 20 and provided with a plurality of antennas for receiving signals arriving with different frequencies. In FIG. 20, only the antennas (2001-A) and (2001-B) are shown. The antenna (2001-A) receives a signal transmitted with a frequency fA from a mobile station and the antenna (2001-B) receives a signal transmitted with a frequency fB from a mobile station. The hardware configuration of the base station is the same as that shown in FIG. 14. Hereunder, the base band processing CPU/base band processing hardware (1101-m) is referred to as LSI#m so as to simplify the description.

When communicating with a mobile station provided with a function for transmitting/receiving signals with use of a plurality of frequencies simultaneously, the code-division multiple connection mobile communication base station apparatus of the present invention de-modulates a received signal with a frequency from the mobile station independently, then combines the signal with other signals, thereby obtaining a diversity effect. To combine those signals, each of those signals must be held in the same LSI. The code-division multiple connection mobile communication base station apparatus of the present invention is provided with a function for holding a channel transmitted with a frequency fA from the mobile station and another channel transmitted with another frequency from the same mobile station so as to enable the processing. More concretely, if the LSI #m has already held a channel transmitted with a frequency fA from a mobile station and the LSI #m is to hold another channel transmitted with another frequency fB from the same mobile station, one of the following procedures (1) to (4) can be used according to the state of the base band processing CPU/base band processing hardware.

(1) If the LSI #m holding a channel transmitted with a frequency fA still has a margin for holding another channel transmitted with another frequency fB, the LSI #m holds the new channel transmitted with the frequency fB as it is.

(2) If the LSI #m holding a channel transmitted with a frequency fA does not have a margin for holding another channel transmitted with another frequency fB and another LSI #n can hold both channels transmitted with different frequencies fA and fB, the LSI #n holds the channel transmitted with the frequency fB and the LSI #n holds the channel transmitted with the frequency fA; concretely, the channel assignment to LSI #m is changed to LSI #n.

(3) If the LSI #m holding the channel transmitted with the frequency fA does not have a margin for holding another channel transmitted with another frequency fB, and any of the other LSIs, which do not have a margin for holding both channels transmitted with different frequencies fA and fB, can hold both channels transmitted with different frequencies fA and fB by changing the channel assignment to the LSI one or more times, then the channel assignment to the LSI is changed, thereby both channels transmitted with different frequencies fA and fB are held in the same LSI.

(4) If the same LSI cannot hold both channels transmitted with different frequencies fA and fB even with changes of channel assignment, "combination of those signals disabled" is notified to the base station controller.

Hereafter, a channel transmitted with a frequency fA from a mobile station will be referred to as channel A and a channel transmitted with a frequency fB from a mobile station will be referred to as channel B so-as to simplify the description. Consequently, just like in the sixth embodiment, seamless changes of channel assignment and a combination of signals can be started with use of the procedure shown in FIG. 17.

As described above, when communicating with a mobile station provided with a function for transmitting/receiving signals with use of a plurality of frequencies, it is possible to combine signals transmitted from a plurality of mobile stations with different frequencies in the same LSI, thereby obtaining a diversity effect.

Because each modem processing in the base band unit is divided into processing units and processings of a plurality of channels are processed in those divided calculators in a time-multiplexing manner, the system hardware can be reduced in size, and because the hardware configuration employs this method, the processing load of the base station is dispersed, thereby channel assignment can be controlled so that hardware resources and software processings can be distributed to a plurality of users who are using different transmission rates.

The hardware, when employing this method, can also be used for both voice and high speed data communications, as well as mixed communications of both voice and high speed data. In addition, with use of a function for checking for a load over an allowable load, the system can be constructed easily as a fault-tolerant one.

Because the present invention can provide a procedure for retrying holding of a plurality of signals from different sectors to be combined in the same base band demodulator in a hand-over processing, it is possible to integrate both a receiving function and an inter-sector combining function in a card or chip. In addition, the present invention can eliminate the need for a bus structure to collect data from a plurality of boards or chips. Even when it is difficult to distribute signals to all the base band demodulators from all the sectors generated due to the employed multi-sector method, the present invention can change signal assignment among those demodulators, thereby channel assignment can be realized flexibly so as to make it easier to combine signals from sectors.

What is claimed is:

1. A control method of assigning a channel to a plurality of modem processing means of a radio frequency (RF) base station to demodulate a base band received signal and modulate a transmit data signal, said modem processing means each operating in a time-multiplexing manner, said control method comprising the steps of:

converting a plurality of carrier frequency band signals received by a plurality of antennas provided in said RF base station to a plurality of base band received signals in a RF unit;

storing a plurality of said base band received signals in a buffer memory; and assigning a respective channel to a respective modem processing means for demodulating said base band received signals and for modulating said transmit data signals, including the steps of:

(a) enabling a controller to check the loads of a plurality of said modem processing means, and (b) assigning a channel to a modem processing means still having a minimum level of load margin if there are a plurality of said modem processing means still having a load margin, respectively, wherein channel assignment to a plurality of said modem processing means is in a hand-over processing executed by a RF mobile station moving from a first sector controlled by said RF base station to a second sector so that a second channel for demodulating a second signal received by a second antenna of said RF base station and a first channel for demodulating a first signal received by a first antenna are assigned a same modem processing means, said first signal being transmitted from said RF mobile station and forming a first sector, said second signal being transmitted from said RF mobile station and forming a second sector, and wherein said same modem processing means of said RF base station combines said first signal received by the first antenna and said second signal received by the second antenna to output a combined signal.

2. The control method according to claim 1, wherein the load of a modem processing means is checked before said second channel is assigned to said modem processing means so as not to assign said second channel to said modem processing means when said modem processing means is loaded inversely.

3. A control method of assigning a channel to execute a hand-over processing of a radio frequency (RF) mobile station moving from a first sector controlled by a first antenna of an RF base station to a second sector controlled by a second antenna of said RF base station, wherein said first channel for demodulating said first signal received by said first antenna from said RF mobile station and said second channel for demodulating said second signal received by said second antenna from said RF mobile station are assigned to a same modem processing unit, wherein said channel assignment is performed in said hand-over processing so that channel assignment to a plurality of modem processing units of an RF base station is changed, whereby if the second channel cannot be assigned to a modem processing unit to which the first channel is currently assigned, the first and the second channels are assigned to another modem processing unit capable of accommodating both the first and the second channels.

4. A control method of assigning a channel comprising the step of:

assigning a first channel for demodulating a first frequency signal of a radio frequency (RF) mobile station, received by a first antenna of a RF base station from said RF mobile station, and a second channel for demodulating a second frequency signal of said RF mobile station, received by a second antenna of said RF base station from said RF mobile station, to a same modem processing unit of said RF based station, wherein said channel assignment is performed so that channel assignment to a plurality of said modem processing means of said RF base station is changed, whereby if the second channel cannot be assigned to a modem processing unit to which the first channel is currently assigned, the first and the second channels are assigned to another modem processing unit capable of accommodating both the first and the second channels.

5. The control method according to claim 3, wherein an assignment of said first channel is released after successfully processing said first channel and said second channel in said another modem processing unit.

6. The control method according to claim 1, wherein the assignment of said first channel and said second channel to said same modem processing means is performed after said first channel and said second channel are temporarily assigned to two different modem processing means, and a switching timing from said two different modem processing means to said same modem processing means is determined as a timing that is two frames after an arrival of a switching command to each of said two different modem processing means.

7. The control method according to claim 1, wherein the assignment of said first channel and said second channel to said same modem processing means is performed after said first channel and said second channel are temporarily assigned to two different modem processing means, and before switching from said two different modem processing means to said same modem processing means, a transmission signal from said RF mobile station is modulated and its transmission power is set to zero, and after the switching is performed said transmission power is turned on.

* * * * *